United States Patent [19]
Sato et al.

[11] Patent Number: 5,471,875
[45] Date of Patent: Dec. 5, 1995

[54] SENSOR FOR DETECTING ROTATIONAL MOVEMENT

[75] Inventors: Masayuki Sato; Toshihiro Kobayashi, both of Nagoya; Toru Watanabe, Toyota; Katsuyoshi Mizumoto, Kuwana; Hiroshi Kajino, Nishikasugai; Hideya Kurachi, Toyota, all of Japan

[73] Assignee: Aisin Seiki Kabushiki Kaisha, Kariya, Japan

[21] Appl. No.: 194,908

[22] Filed: Feb. 14, 1994

[30] Foreign Application Priority Data

Feb. 12, 1993 [JP] Japan .................................. 5-24134

[51] Int. Cl.$^6$ .............................. G01P 15/125; G01P 9/04
[52] U.S. Cl. .................................................. 73/504.13
[58] Field of Search ........................ 73/505, 510, 1 D, 73/504

[56] References Cited

U.S. PATENT DOCUMENTS 4,655,081  4/1987  Burdess ........................ 73/505
5,218,867  6/1993  Varnham et al. ............. 73/505

FOREIGN PATENT DOCUMENTS 2061502  5/1981  United Kingdom .
2215054  2/1988  United Kingdom .
2266149  4/1992  United Kingdom .

Primary Examiner—Hezron E. Williams
Assistant Examiner—Helen C. Kwok
Attorney, Agent, or Firm—Sughrue, Mion, Zinn, Macpeak & Seas

[57] ABSTRACT

A sensor for detecting rotational movement includes a cylindrical shaped resonator having an outer surface, a first pair of diametrically opposed driving electrodes provided on the outer surface of the resonator, a second pair of diametrically opposed driving electrodes provided on the outer surface of the resonator, a device for generating concurrently a first force and a second force at each of the first driving electrodes and each of the second driving electrodes, respectively, in such a manner that the first force reverses its direction along the radius of the resonator at a regular interval, the second force reverses its direction along the radius of the resonator at a regular interval, and the direction of the first force is opposite to the direction of the second force.

5 Claims, 4 Drawing Sheets 5,471,875

SENSOR FOR DETECTING ROTATIONAL MOVEMENT

BACKGROUND OF THE INVENTION

The present invention relates to a sensor for detecting rotational movement.

Conventionally, such a sensor is disclosed in GB 2061502 and GB 2154739, for example. In the conventional sensor for detecting rotational movement about an axis, a resonator which is in the form of a cup or cylinder is expected to be applied with radial vibrations by means of a pair of transducers. When the resonator rotates, the radial vibrations are detected by another pair of transducers for detecting rotational movement.

However, in the foregoing structure, the vibrations are along the radial direction of the resonator and the number of the points to which the vibrations are applied is two, by which the amplitude of the resonator is relatively small. Thus, due to a slight error of the resonator in rating such as length or radius and/or an asymmetry of the resonator about its axis which appears in an unevenness of weight or shape, the oscillation of the resonator becomes a non-uniform one, whereby a shift of nodes is generated. Thus, a null voltage becomes large, which results in that an improvement of the accuracy of the sensor is disturbed or prevented.

SUMMARY OF THE INVENTION

It is, therefore, an object of the present invention is to provide a sensor for detecting rotational movement without the foregoing drawbacks.

Another object of the present invention is to provide a sensor for detecting rotational movement in which a null voltage is restricted as small as possible.

In order to attain the foregoing objects, a sensor for detecting rotational movement is comprised of a cylindrical shaped resonator having an outer surface, a first pair of radially opposed driving electrodes provided on the outer surface of the resonator, a second pair of radially opposed driving electrodes provided on the outer surface of the resonator, and means for generating concurrently a first force and a second force at each of the first driving electrodes and each of the second driving electrodes, respectively, in such a manner that the first force reverses its direction along the radius of the resonator at a regular interval, the second force reverses its direction along the radius of the resonator at a regular interval, and the direction of the first force is opposite to the direction of the direction of the second force.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DESCRIPTION OF A PREFERRED EMBODIMENT

Figure 1:
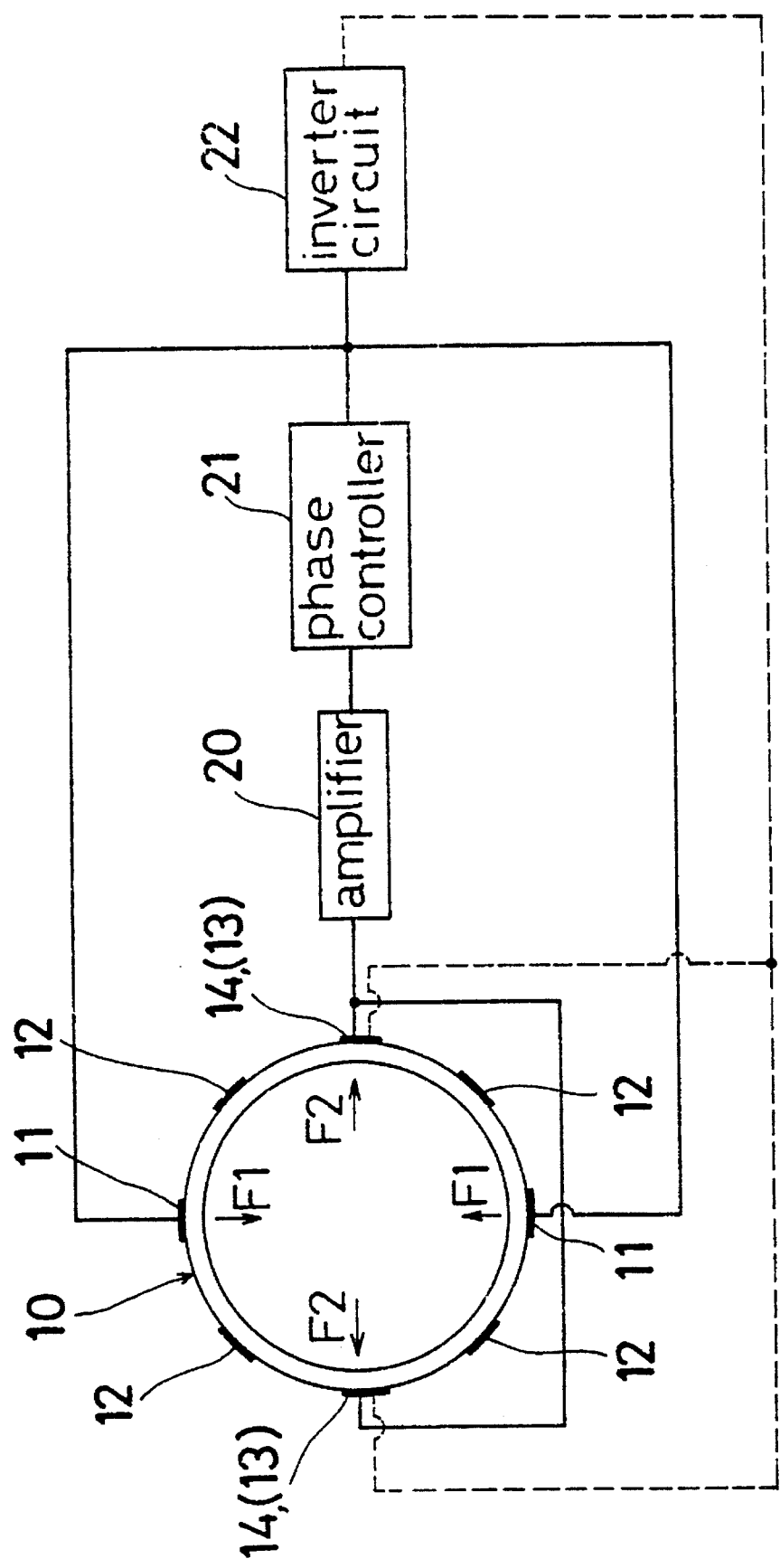
FIG. 1 is a circuit diagram of a sensor for detecting rotational movement in accordance with the present invention.

A preferred embodiment of the present invention will be described hereinunder in detail with reference to the accompanying drawings.

Referring to FIGS. 1 to 7 inclusive, a sensor for detecting rotational movement or a gyroscopic device includes a cylindrical shaped resonator 10 which is made of piezo-electric ceramic. On an outer surface of the resonator 10, there are provided eight identical equispaced electrodes 11, 12, 13, 12, 11, 12, 13 and 12 which are arranged in this order in the circumferential direction. The electrodes 11 are used as driving electrodes, the electrodes 12 are used as detecting electrodes, and the electrodes 13 are used as a pair of additional driving electrodes. A pair of opposed feedback electrodes 14 are provided on the outer surface of the vibrator 10 in such a manner that the feedback electrodes 14 are identical in phase and offset in the axial direction of the vibrator 10. The feedback electrodes 14 are electrically connected to an amplifier 20 and an output voltage fed from each electrodes 14 is amplified before being transmitted to a phase shifter or phase controller 21. The phase of the output voltage or amplified voltage outputted from the amplifier 20 is expected to be adjusted at the phase shifter 21 and the resultant voltage is outputted therefrom to the driving electrodes 11 and an inverter circuit 22. The voltage fed to the inverter circuit 22 is inverted in its phase and the resultant voltage is expected to be outputted therefrom to the additional driving electrodes 13.

Figure 2:
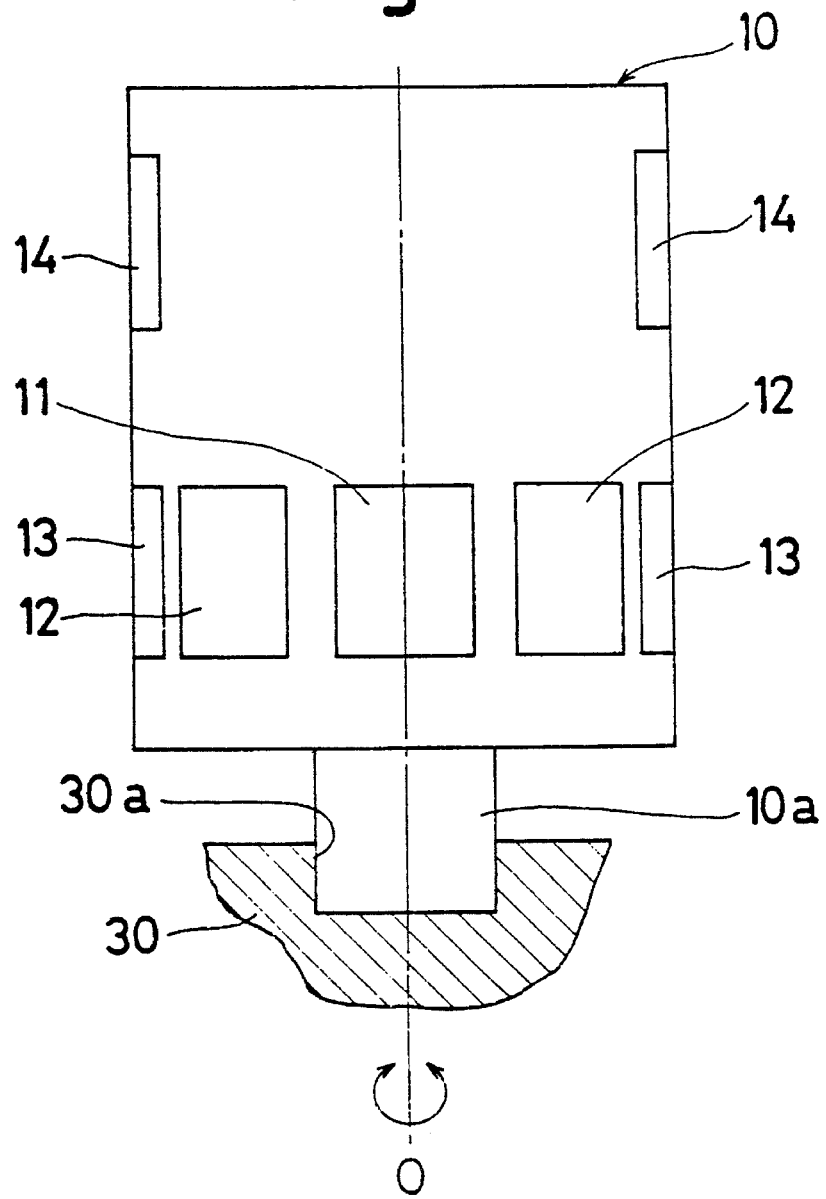
FIG. 2 is a side view of a resonant of a sensor shown in FIG. 1.

As can be seen from FIG. 2, the resonator 10 has a lower projection 10a which is fitted in a bore 30a of a base body 30 in order that the resonator 10 is expected to detect a rotational angular speed of the base body 30 under rotation about its central axis O. The rotational angular speed of the base body 30 can be detected by measuring a voltage generated at the detecting electrode 12. It is to be noted that such a voltage is set to be amplified by a calculating means (not shown).

Figure 3:
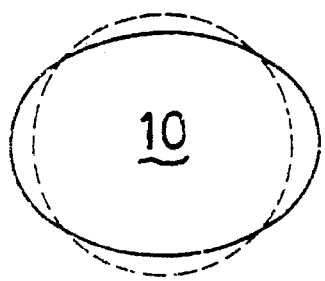
FIG. 3 is a view showing how a resonator is vibrated.
Figure 4:
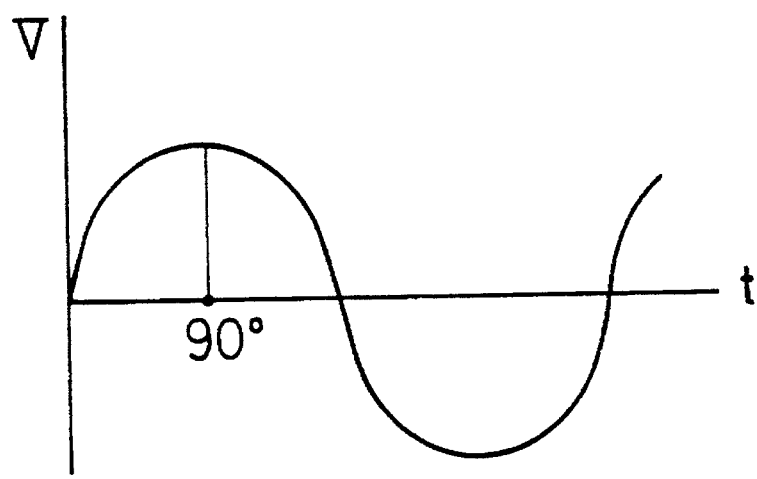
FIG. 4 shows a wave-shape of voltage outputted from a shift controller.
Figure 5:
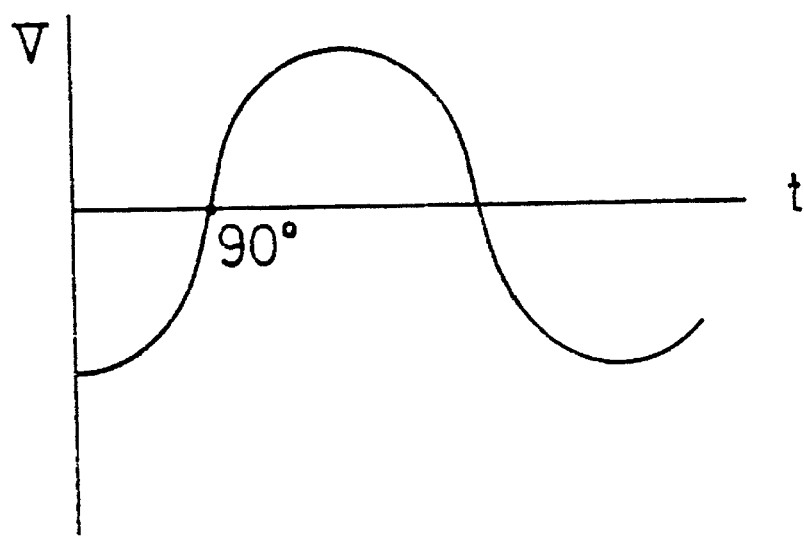
FIG. 5 shows a wave-shape of voltage outputted from an amplifier.
Figure 6:
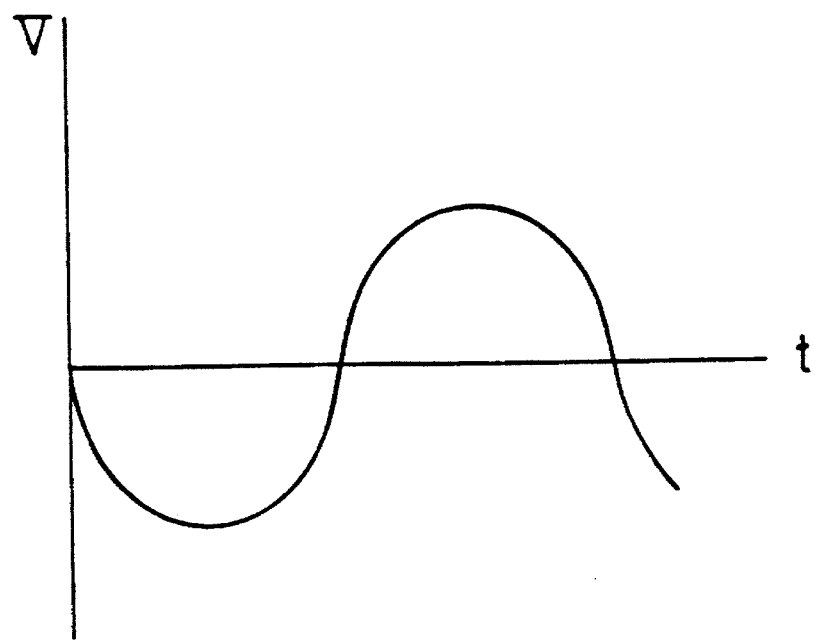
FIG. 6 shows a wave-shape of voltage outputted from an inverter.
Figure 7:
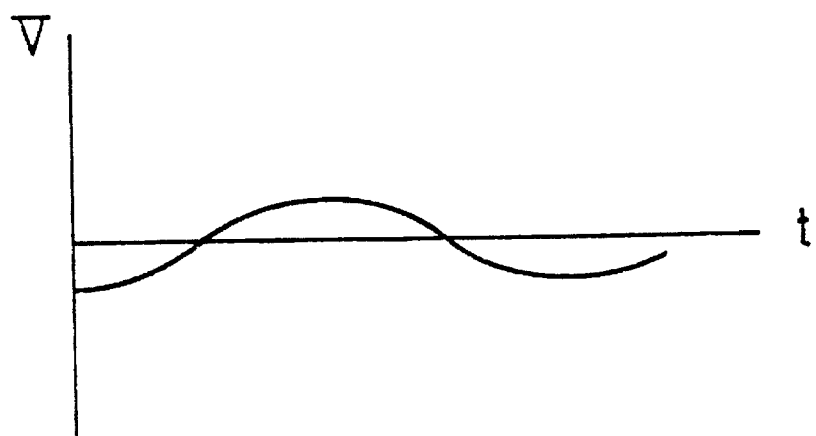
FIG. 7 shows a wave-shape of voltage outputted from a detecting electrode.

In operation, if the phase shifter 21 is in receipt of the voltage which is of a wave-form shown in FIG. 5, this voltage is delayed by 90 degrees as shown in FIG. 4. The resultant voltage is applied to the driving electrodes 11. Simultaneously, the resultant voltage is also fed to the inverter circuit 22, resulting in that the inputted voltage is converted into the inverted voltage as shown in FIG. 6 which advances 90 degrees relative thereto. Then, the resonator 10 is applied with a first force F1 which compresses the resonator 10 from each of the driving electrode 11 in the radially inward direction and a second force F2 which pulls the resonator 10 from each of the additional driving electrodes 13 in the radially outward direction. Thus, as a whole, the shape of the resonator 10 is brought into a deformed one as shown in FIG. 3. Due to this deformation of the vibrator 10, from each of the feedback electrodes 14, the voltage having the wave shape as shown in FIG. 3 is fed to the amplifier 20. Since the amplitude is small, this voltage is set to be amplified at the amplifier 20 so as to become one as shown in FIG. 5 before being outputted again to the phase shifter 21. A repetition of the foregoing steps or procedures will establish vibrations of the resonator 10.

As mentioned above, the first force which acts from each of the driving electrodes to the vibrator 10 so as to compress the same in the radial direction and the second force which acts from each of the feedback electrodes to the resonator 10 so as to pull the same in the radial direction simultaneous to the first force will result in the resonator 10 being vibrated by forces at four portions of the resonator 10. Thus, the amplitude of the resonator 10 becomes remarkably increased, thereby preventing the offset of nodes which results from a size error of the resonator 10, a partial weight of the resonator 10 and an evenness of the shape of the resonator 10. Therefore, the null voltage can be restricted.

The invention has thus been shown and described with reference to reference to a specific embodiment, however, it should be noted that the invention is in no way limited to the details of the illustrated structures but changes and modifications may be made without departing from the scope of the appended claims.

What is claimed is:

1. A sensor for detecting rotational movement comprising:

a cylindrical resonator made of a piezo-electric material and having an outer surface;

a first pair of driving electrodes provided on said outer surface of said resonator and circumferentially spaced 180 degrees relative to each other;

a second pair of driving electrodes provided on said outer surface of said resonator and each being circumferentially spaced 90 degrees from said first pair of driving electrodes, a pair of feedback electrodes provided on said outer surface of said resonator and each being circumferentially spaced from said first pair of driving electrodes 90 degrees;

a phase controller for detecting a first voltage outputted from each of said feedback electrodes due to radial deformation of said resonator and for feeding a second voltage to each of said first pair of driving electrodes;

an inverter circuit for inverting said second voltage fed from said phase controller to said first pair of driving electrodes to provide an inverted voltage and for feeding said inverter voltage to each of said second pair of driving electrodes;

at least a pair of detecting electrodes provided on the outer surface of said resonator; and means connected to each of said detecting electrodes for detecting a rotational movement of said resonator, wherein first radial forces and second radial forces are generated concurrently at said first pair of driving electrodes and said second pair of driving electrodes, respectively, in such manner that each of said first radial forces changes direction of action from radially outwardly to radially inwardly at a constant interval, each of said second radial forces changes direction of action from radially outwardly to radially inwardly at said interval, and that whenever said first forces act radially inwardly, said second forces act radially outwardly.

2. A sensor for detecting rotational movement according to claim 1, wherein the second driving electrodes are different from the feedback electrodes in axial position.

3. A sensor for detecting rotational movement according to claim 1, wherein the first driving electrodes and the second driving electrodes are arranged in an equispaced manner.

4. A sensor for detecting rotational movement according to claim 1, wherein the piezo-electric material is a piezo-electric ceramic.

5. A sensor for detecting rotational movement according to claim 1 further comprising an amplifier between each of the feedback electrodes and the phase controller.

* * * * *